No. 875,264. PATENTED DEC. 31, 1907.
F. HOELDER & C. J. WELZIN.
AUTOMATIC CUT-OFF.
APPLICATION FILED AUG. 10, 1906.
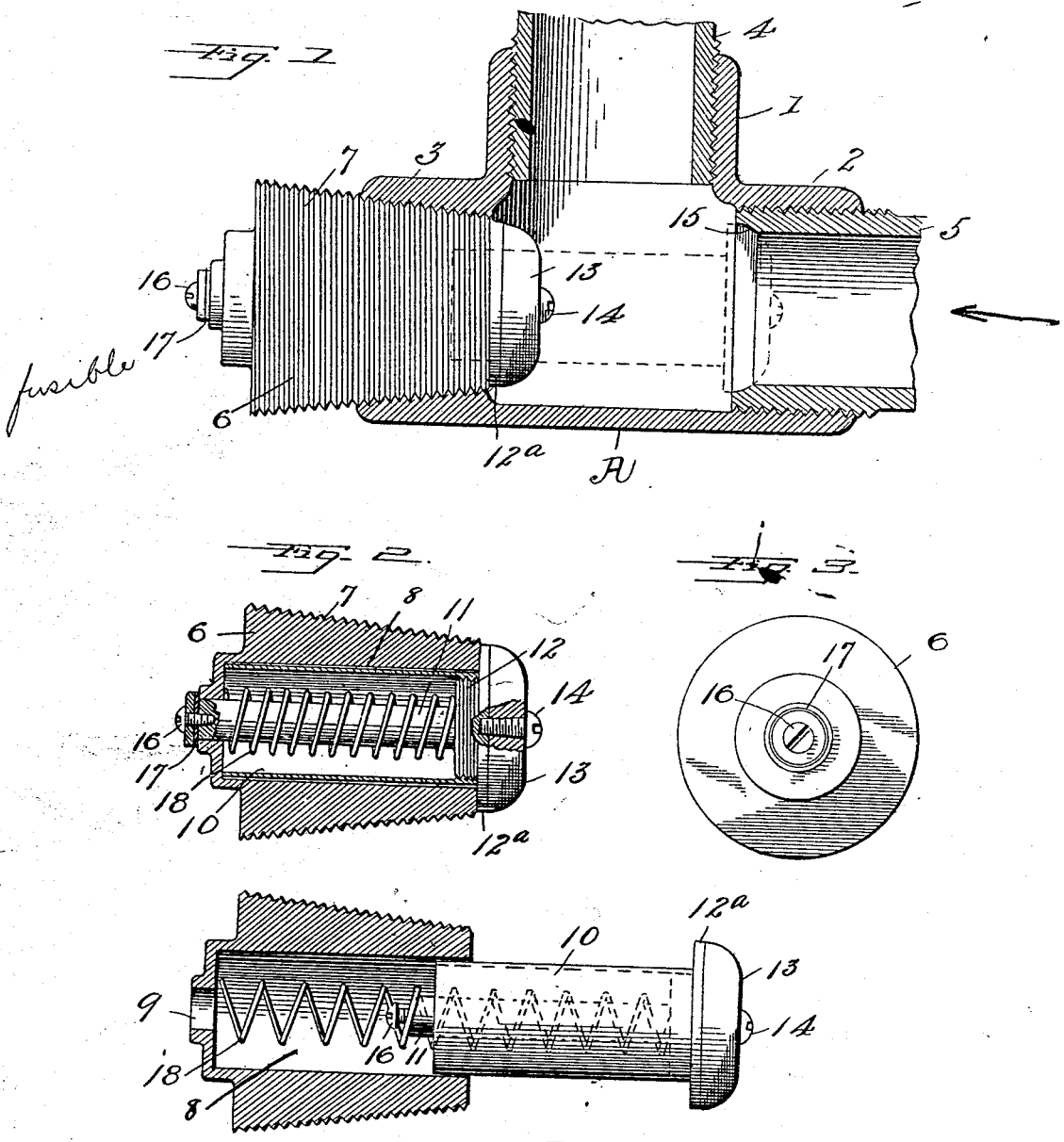

UNITED STATES PATENT OFFICE.

FERDINAND HOELDER AND CHARLES J. WELZIN, OF NEW YORK, N. Y.

AUTOMATIC CUT-OFF.

No. 875,264.   Specification of Letters Patent.   Patented Dec. 31, 1907.

Application filed August 10, 1906. Serial No. 330,060.

*To all whom it may concern:*

Be it known that we, FERDINAND HOELDER and CHARLES J. WELZIN, citizens of the United States, residing at New York, in the county of New York and State of New York, have invented certain new and useful Improvements in Automatic Cut-Offs, of which the following is a specification.

This invention relates to new and useful improvements in automatic cut offs and relates particularly to a cut off mechanism embodying a fusible connection designed to be broken under extreme heat for normally holding the cut off valve in open position.

The invention is especially designed as an improvement upon our former patent No. 800,740 and particularly comprises a removable plug carrying a slidable valve and in this connection it is a primary object of the present invention to provide novel means for guiding the valve in its slidable movement, whereby said valve may be effectively centered on the valve seat.

The invention aims as a further object to provide a novel fusible connection having the function above stated.

The detailed construction will appear in the course of the following description in which reference is had to the accompanying drawings forming a part of this specification, like numerals designating like parts throughout the several views, wherein, Figure 1 is a central longitudinal section of an apparatus constructed in accordance with our invention. Fig. 2 is a central longitudinal section of the removable plug embodying the cut off valve in its closed position. Fig. 3 is a rear elevation of said plug, and Fig. 4 is a section similar to Fig. 2, showing the cut-off valve in its open position.

In the practical embodying of the invention, the letter A designates a T coupling provided with a vertical arm 1 and registering horizontal arms 2 and 3. The arm 1 has connection with a distribution pipe 4 and the arm 2 has connection with a supply pipe 5. A plug 6 which carries the cut-off mechanism is secured in the arm 3 and to this end is formed with a tapered threaded surface 7 by which said plug has detachable connection with said arm. The plug 6 is formed with an axial cylindrical bore 8 and in its rear wall with a reduced central opening 9, communicating with said bore. A sleeve 10 fits snugly within the bore 8 and has slidable movement therein. Mounted axially of the sleeve 10 is a valve stem 11 which projects at its rear end into the opening 9 and at its forward end terminates in an enlarged threaded portion 12 by which said stem 11 has connection with the sleeve 10, a flange 12$^a$ being provided upon the enlarged portion 12 exteriorly of the plug 6 and bearing against said plug. A flexible valve head is detachably secured to the flange 12$^a$ by a screw 14 and confronts a concaved annular valve seat 15 formed upon the end of the supply pipe 5 and upon which the valve head 13 is designed to seat. The stem 11 is normally held with the flange 12$^a$ abutting the plug 6 by a fusible connection embodying a screw 16 carried by said plug and a fusible washer 17, consisting of fuse metal and a paper washer surrounding said screw and bearing against the rear face of the plug 6. An expansive coil spring 18 surrounds the stem 11, one end of said spring bearing against the rear wall of the plug 6 and the other end bearing against the enlarged portion 12.

In operation, in the event of fire or a dangerously high temperature which would tend to heat the pipes and to cause an explosion of the gas, the fuse washer 17 will melt and destroy the connection between the sleeve 10 and the plug 6. The spring 18 then exerts its pressure to force the plug 6 outwardly as shown in Fig. 3 and in dotted lines in Fig. 1. The plug 6 in its outward movement carries the head 12 until the latter is centered upon the valve seat 15 to shut off the supply of gas. In the sudden outward movement of the sleeve 10 the bore 8 serves to guide and center said sleeve in order that the valve head 13 may have a perfectly true seating and insure perfect safety against the escape of gas.

While the elements herein shown and described are well adapted to serve the functions set forth, it is obvious that various minor changes may be made in the proportions, shape and arrangement of the several parts without departing from the spirit and scope of the invention as defined in the appended claims.

Having fully described our invention we claim:

1. In a device of the type set forth, a T-coupling formed in its interior surface adjacent one leg with a valve seat, a hollow removable plug mounted in the opposing leg and confronting said valve seat, a sleeve slidably mounted in said plug axially thereof, a valve stem terminating in an enlarged portion threaded within the end of said sleeve and a circular flange beyond said sleeve, a flexible head removably secured on said flange, said valve stem projecting through said plug and being held therein by exterior fusible connections secured to the projecting end of said stem, and an expansive coil spring surounding said stem and bearing with one end against said plug.

2. In a device of the type set forth, a T coupling formed in its interior surface adjacent one leg with a valve seat, a hollow removable plug mounted in the opposing leg and confronting said valve seat, a sleeve slidably mounted in said plug axially thereof, a valve stem terminating in an enlarged portion threaded within the end of said sleeve and a flexible valve head beyond said threaded portion, said valve stem projecting through said plug and being held therein by exterior fusible connections secured to the projecting end of said stem, an expansive coil spring surrounding said stem and bearing with one end against said plug and a valve head carried by said valve stem.

In testimony whereof I affix my signature in presence of two witnesses.

FERDINAND HOELDER.
CHARLES J. WELZIN.

Witnesses:
　GEORGE H. FRASER,
　P. FELS.